United States Patent
Oya et al.

(10) Patent No.: US 12,266,194 B2
(45) Date of Patent: Apr. 1, 2025

(54) VEHICLE OCCUPANT DETECTION SYSTEM

(71) Applicant: TOYOTA JIDOSHA KABUSHIKI KAISHA, Toyota (JP)

(72) Inventors: Kentaro Oya, Toyota (JP); Takahiro Izuno, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 366 days.

(21) Appl. No.: 18/076,749

(22) Filed: Dec. 7, 2022

(65) Prior Publication Data
US 2023/0206655 A1 Jun. 29, 2023

(30) Foreign Application Priority Data
Dec. 23, 2021 (JP) .................. 2021-209719

(51) Int. Cl.
| | |
|---|---|
| *G06V 20/59* | (2022.01) |
| *G06T 7/73* | (2017.01) |
| *G06T 7/90* | (2017.01) |
| *G06V 40/10* | (2022.01) |

(52) U.S. Cl.
CPC .......... *G06V 20/59* (2022.01); *G06T 7/73* (2017.01); *G06T 7/90* (2017.01); *G06V 40/10* (2022.01); *G06T 2207/10024* (2013.01); *G06T 2207/30196* (2013.01); *G06T 2207/30268* (2013.01)

(58) Field of Classification Search
CPC ........ G06V 20/59; G06V 40/10; G06V 10/56; G06T 7/73; G06T 7/90; G06T 2207/10024; G06T 2207/30196; G06T 2207/30268
See application file for complete search history.

(56) References Cited

U.S. PATENT DOCUMENTS
2021/0107421 A1 4/2021 Uno

FOREIGN PATENT DOCUMENTS
| | | | |
|---|---|---|---|
| JP | 2005222359 A | * | 8/2005 |
| JP | 2009107527 A | * | 5/2009 |
| JP | 2016-107817 A | | 6/2016 |
| JP | 2020-003936 A | | 1/2020 |
| KR | 20150046979 A | * | 5/2015 |

* cited by examiner

*Primary Examiner* — Samir A Ahmed
(74) *Attorney, Agent, or Firm* — Oliff PLC

(57) ABSTRACT

A vehicle occupant detection system includes a processor that extracts, using an occupant detection area position information stored in a memory, an occupant detection area within a captured image of an in-vehicle camera, and detects any occupant in that area. The processor executes a correction mode using a correction-purpose image obtained by capturing, using the camera, a linearly-extending metal frame exposed when a vehicle door is open. In the correction mode, the processor detects an actual position of the metal frame in the correction-purpose image, calculates, as a shift amount, a difference between the actual metal frame position and an expected metal frame position in the correction-purpose image, and updates the occupant detection area position information in the memory such that an area reached by moving the occupant detection area of the current captured image by the shift amount serves as the occupant detection area of a new captured image.

6 Claims, 9 Drawing Sheets

VEHICLE OCCUPANT DETECTION SYSTEM

CROSS REFERENCE TO RELATED APPLICATION

This application claims priority to Japanese Patent Application No. 2021-209719 filed on Dec. 23, 2021, which is incorporated herein by reference in its entirety including the specification, claims, drawings, and abstract.

TECHNICAL FIELD

The present disclosure relates to a vehicle occupant detection system, and more particularly to a system having a function to correct an occupant detection area in an image captured by an in-vehicle camera.

BACKGROUND

Conventionally, there has been known an occupant detection system in which, in a vehicle such as a bus, a camera installed at an upper part of the vehicle interior is used to capture an image of the vehicle interior, and from the captured image of this camera, whether or not an occupant is present within an occupant detection area pre-specified on the floor of the vehicle interior is detected.

JP 2016-107817 A discloses an in-vehicle accident prevention system in which, from a captured image obtained using a camera capturing an observation area designated in a bus interior, when a standing occupant is detected within the observation area, a warning is displayed on a display device provided in front of the driver's seat.

In an occupant detection system, a camera installed at an upper part of the vehicle interior obtains a captured image by capturing a region including an occupant detection area pre-specified on the vehicle interior floor. Further, a processor reads out, from a memory, position information regarding the occupant detection area in the captured image, uses this position information to extract the occupant detection area within the captured image, and detects an occupant appearing in that area.

There may be cases where the camera becomes shifted from its desired position at instances such as when the camera is being installed on the vehicle body or during travel of the vehicle. In such cases, the occupant detection area within the captured image also becomes shifted, thereby preventing accurate performance of occupant detection. Accordingly, it is desired that, even when the camera is shifted from the desired position, accurate occupant detection is made possible by correcting the position information of the occupant detection area in the captured image.

An object of the present disclosure is to provide a vehicle occupant detection system in which the position of the occupant detection area in an image captured by the camera can be corrected.

SUMMARY

A vehicle occupant detection system according to the present disclosure includes: a camera, which is installed at an upper part of a vehicle interior and configured to obtain a captured image by capturing a region including an occupant detection area pre-specified on a vehicle interior floor; a memory configured to store occupant detection area position information regarding the occupant detection area in the captured image; and a processor configured to extract the occupant detection area within the captured image using the occupant detection area position information and to detect an occupant appearing in that area. The processor executes a correction mode for correcting the occupant detection area position information using a correction-purpose image obtained by capturing, using the camera, a linearly-extending metal frame when a vehicle door is open, wherein the metal frame is located underneath the vehicle door when the vehicle door is closed and is exposed when the vehicle door is open. In the correction mode, the processor detects an actual position of the metal frame in the correction-purpose image, and calculates, as an amount of shift, a difference between the actual position of the metal frame and an expected position of the metal frame in the correction-purpose image, wherein the expected position is stored in advance in the memory. Further, the processor updates the occupant detection area position information of the captured image such that an area reached by moving, by the amount of shift, the occupant detection area of the current captured image indicated by the occupant detection area position information serves as the occupant detection area of a new captured image.

In the vehicle occupant detection system according to the present disclosure, the processor may detect whether or not an occupant is present in the vehicle interior by analyzing the correction-purpose image, and may execute the correction mode upon detecting that no occupant is present in the vehicle interior.

In the vehicle occupant detection system according to the present disclosure, in the correction mode, the processor may detect, from a color difference between the metal frame and the vehicle interior floor in the correction-purpose image, an actual position of a contour, on a side toward the vehicle interior floor, of the metal frame in the correction-purpose image. The processor may further calculate, as the amount of shift, a difference between the actual position of the contour of the metal frame and an expected position of the contour, on the side toward the vehicle interior floor, of the metal frame in the correction-purpose image, wherein the expected position is stored in advance in the memory.

In the vehicle occupant detection system according to the present disclosure, in the correction mode, the processor may detect, from a color difference between the metal frame and an outside of a vehicle body in the correction-purpose image, an actual position of a contour, on a side toward the outside of the vehicle body, of the metal frame in the correction-purpose image. The processor may further calculate, as the amount of shift, a difference between the actual position of the contour of the metal frame and an expected position of the contour, on the side toward the outside of the vehicle body, of the metal frame in the correction-purpose image, wherein the expected position is stored in advance in the memory.

According to the present disclosure, since an image of the metal frame is captured using the camera, and the metal frame is a part which is unlikely to be changed as a result of design changes in the vehicle interior or the like and which is easily detected in the correction-purpose image due to its color difference from the surroundings and its linear shape, the position of the metal frame can be accurately identified in the correction-purpose image. Therefore, the amount of shift of the metal frame in the correction-purpose image that occurs according to a shift in the camera position can be determined, and by reflecting this amount of shift in the position of the occupant detection area in a captured image, the position of the occupant detection area can be corrected.

BRIEF DESCRIPTION OF DRAWINGS

Embodiment(s) of the present disclosure will be described based on the following figures, wherein.

DESCRIPTION OF EMBODIMENTS

Embodiments of the present disclosure will now be described by reference to the drawings. The configurations described below are examples provided for the purpose of explanation only, and changes can be made thereto as appropriate according to vehicle specifications and the like. In all of the drawings, the same elements are labeled with the same reference signs, and repeated description will not be provided. In each drawing, the arrow FR denotes the vehicle front direction, the arrow UP denotes the vehicle upward direction, and the arrow RW denotes the vehicle right direction.

Figure 1:
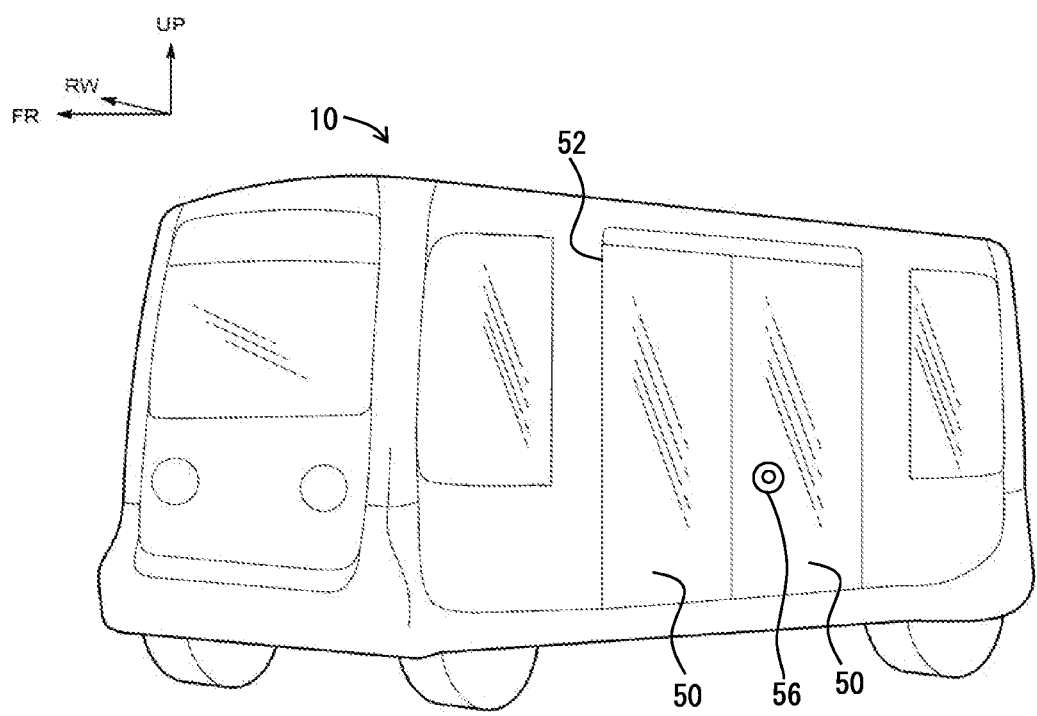
FIG. 1 is a perspective view of a vehicle according to an embodiment.
Figure 2:
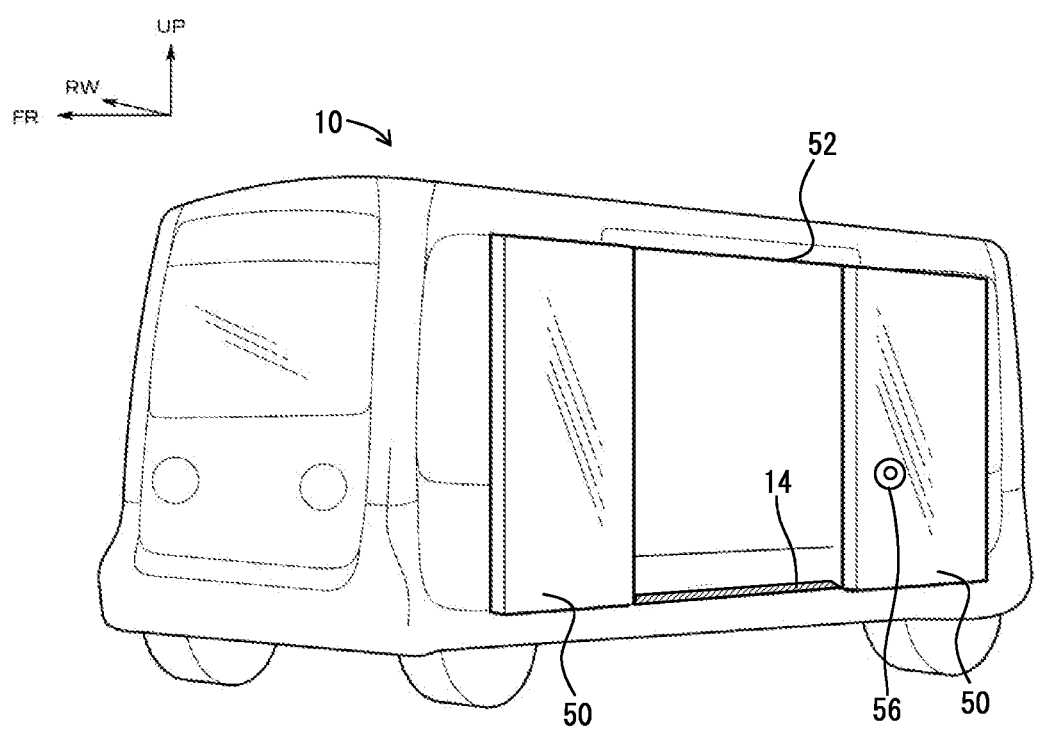
FIG. 2 is a perspective view of the vehicle with its doors in an open state.
Figure 3:
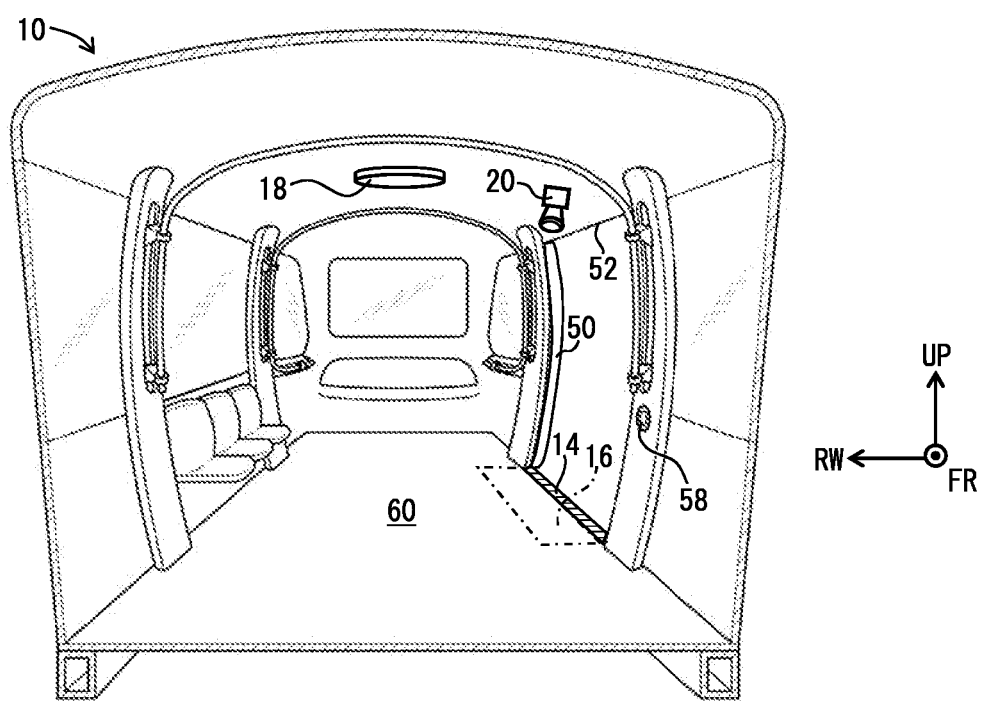
FIG. 3 is a diagram showing the inside of the cabin of the vehicle.

FIG. 1 is a perspective view of a vehicle 10 according to an embodiment. FIG. 2 is a perspective view of the vehicle 10 with its doors 50 in an open state, and FIG. 3 is a diagram showing the inside of the cabin of the vehicle 10.

The vehicle 10 has an approximate shape of a rectangular solid as shown in FIG. 1, and is an automobile capable of performing automated driving. Specifically, the vehicle 10 can be driven in a plurality of driving modes including an automated driving mode and a manual driving mode. The vehicle 10 is an electric vehicle that uses a rotating electric machine (not shown in drawing) as the drive source. In the vehicle 10, a battery for supplying electric power to the rotating electric machine is installed. According to another embodiment, the vehicle 10 may be an automobile that uses a combustion engine as the drive source.

The vehicle 10 is used as a bus boarded by a large number of passengers from the general public. A boarding/alighting doorway 52 is provided at a side part of the vehicle body of the vehicle 10. The boarding/alighting doorway 52 is located approximately at the center in the vehicle longitudinal direction, and is closed by the doors 50 during travel of the vehicle. The doors 50 are sliding doors, and, as shown in FIG. 2, the boarding/alighting doorway 52 is opened when the front door 50 moves frontward and the rear door 50 moves rearward.

The vehicle 10 comprises a door button 56 arranged on an outer face of the doors, and a door button 58 arranged on a wall located in the vehicle cabin (see FIG. 3) near the boarding/alighting doorway 52. By pushing either one of the door buttons 56, 58 when the doors 50 are in a closed state, the doors 50 become opened. Further, by pushing either one of the door buttons 56, 58 when the doors 50 are in an open state, the doors 50 become closed.

As shown in FIG. 2, at a doorstep portion at a lower part of the boarding/alighting doorway 52, the vehicle 10 comprises a metal frame 14 that extends linearly in the vehicle longitudinal direction. The metal frame 14 is made of aluminum. When the two doors 50 are closed, the metal frame 14 is located underneath the doors 50 and thereby placed in a hidden state, and when the two doors are open, the metal frame 14 is placed in an exposed state. The metal frame 14 has two holes (not shown in the drawing; hereinafter referred to as locking holes) at the center in the vehicle longitudinal direction. The vehicle 10 is configured such that the two doors 50 are placed in a locked state when locking rods (not shown in drawing), which are caused to project from bottom parts of the respective doors 50 when the two doors 50 are closed, respectively enter into the two locking holes in the metal frame 14.

The metal frame 14 is a part which is unlikely to be changed as a result of design changes in the vehicle interior or the like, and, due to its color difference from the surroundings (i.e., the vehicle interior floor, the outside of the vehicle body, etc.) and its characteristic shape (i.e., the linear shape), the metal frame 14 is easily detected in a captured image obtained using a camera 20 as described further below.

As shown in FIG. 3, on the vehicle interior floor 60, a standing prohibited area 16 for occupants is provided adjacent to the metal frame 14. In FIG. 3 and the drawings described further below, the contour of the standing prohibited area 16 is shown in virtual lines (i.e., dot-dashed lines). The standing prohibited area 16 is an area where, in terms of safety consideration, occupants are prohibited from stepping inside during travel of the vehicle. As described below, an image of the standing prohibited area 16 is captured using a camera 20, and whether or not any occupant is in that area is detected.

Hereinafter, the standing prohibited area 16 is referred to as an occupant detection area 16. The camera 20 is installed on the ceiling at a part near the boarding/alighting doorway 52. The camera 20 is configured to capture an image of a region including the occupant detection area 16 and the metal frame 14. The camera 20 may use a wide-angle lens, a fish-eye lens, or the like, and may be capable of capturing a range of 180 degrees or more (for example, 360 degrees).

On the vehicle interior ceiling, a lighting device 18 is installed. Illuminating light from the lighting device 18 is reflected by the metal frame 14 and enters into imaging elements of the camera 20, so that the metal frame 14 appears clearly in an image captured by the camera 20.

Figure 4:
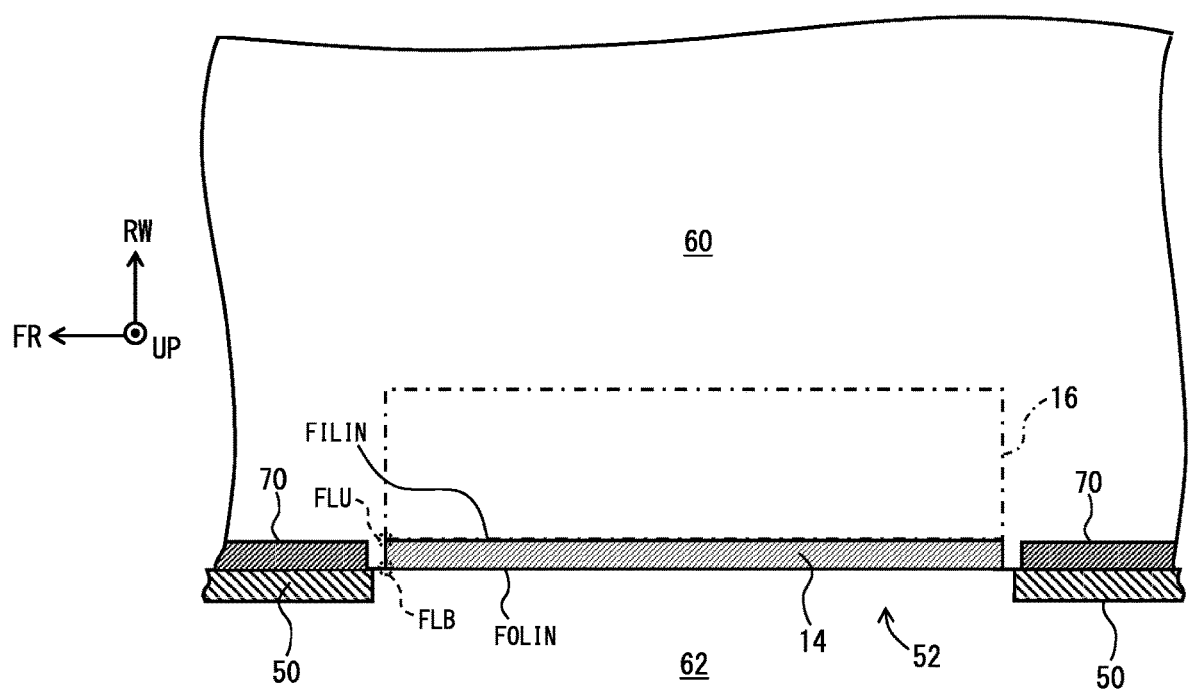
FIG. 4 is a diagram showing an area around a boarding/alighting doorway from above.

FIG. 4 is a diagram showing an area around the boarding/alighting doorway 52 of the vehicle from above. When the boarding/alighting doorway 52 is in an open state, the two doors 50 are located on the outer side of the vehicle body 70. The contours of both of the occupant detection area 16 and the metal frame 14 are rectangular. The metal frame 14 is located between the vehicle interior floor 60 and the outside 62 of the vehicle body. As described below, in the correction mode, a correction-purpose image is obtained by capturing an image of the metal frame 14 using the camera 20. Then, in the correction-purpose image, the position of the contour of the metal frame 14 on a side toward the vehicle interior floor 60 (i.e., the position of one corner (characteristic point FLU) and the slope of contour line FILIN) is detected. Alternatively, in another embodiment described further below, in the correction-purpose image, the position of the contour of the metal frame 14 on a side toward the outside 62 of the vehicle body (i.e., the position of one corner (characteristic point FLB) and the slope of contour line FOLIN) is detected.

Figure 5:
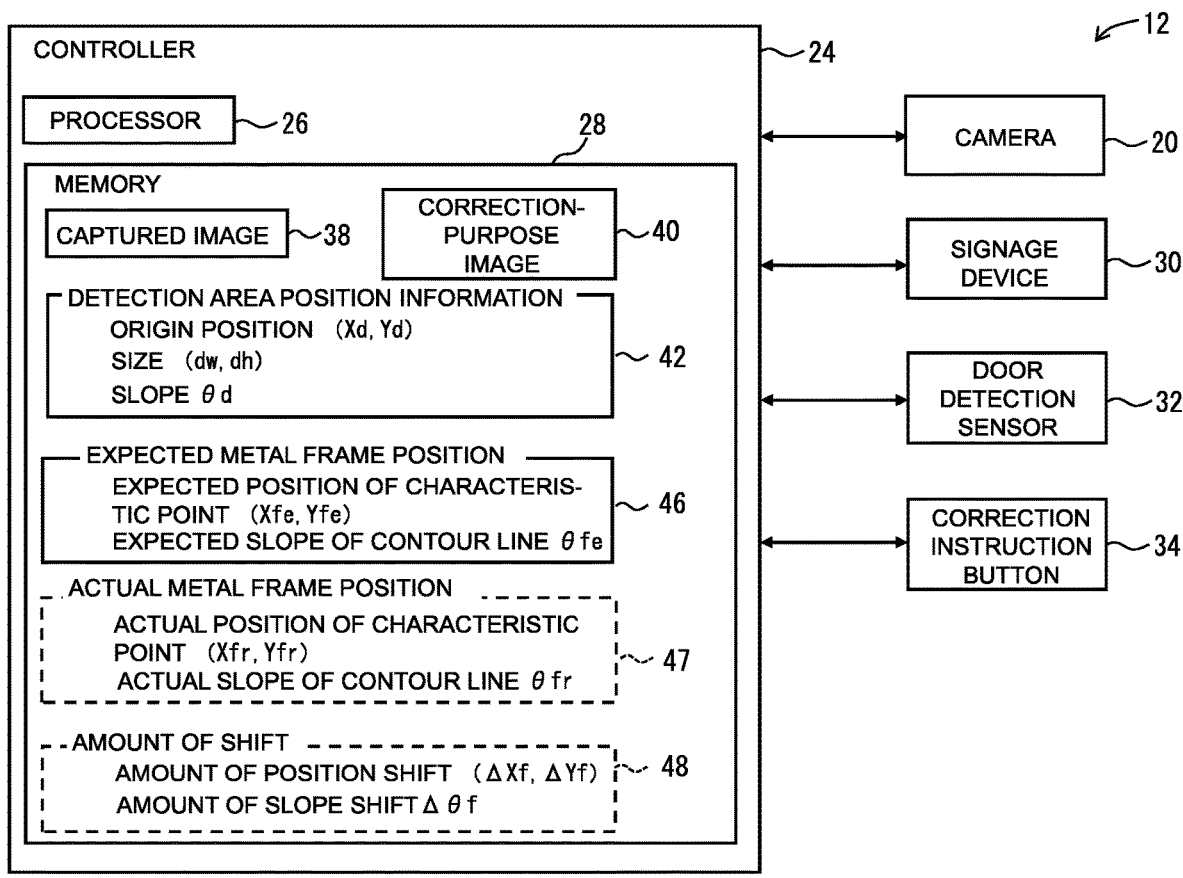
FIG. 5 is a functional block diagram of a vehicle occupant detection system.

FIG. 5 is a functional block diagram of an occupant detection system 12 provided in the vehicle. The occupant detection system 12 comprises a controller 24, the camera 20, a signage device 30, a door detection sensor 32, and a correction instruction button 34.

The controller 24 comprises a processor 26 including a CPU, and a memory 28. The processor 26 operates according to a control program and control data (both not shown in drawing) stored in the memory 28. Instead of or in addition to the CPU, the processor 26 may include an ASIC (application-specific integrated circuit) or the like. The memory 28 is, for example, a RAM, a ROM, a flash memory, or the like. The memory 28 stores a control program, control data, a captured image 38, a correction-purpose image 40, detection area position information 42 (also referred to as occupant detection area position information 42), an expected metal frame position 46, an actual metal frame position 47, and an amount of shift 48.

Among captured images 38 of the camera 20, the correction-purpose image 40 is an image used for the correction mode. All of the detection area position information 42, the expected metal frame position 46, the actual metal frame position 47, and the amount of shift 48 are data used for the correction mode. The detection area position information 42 and the expected metal frame position 46 are data stored in advance in the memory 28 before shipping inspection of the vehicle 10. The actual metal frame position 47 and the amount of shift 48 are data stored temporarily in the memory 28 during a processing of the correction mode.

The signage device 30 is a display device provided on a wall in the vehicle interior near the boarding/alighting doorway 52. The signage device 30 (not shown in FIG. 3) is a device which, when an occupant is detected in the occupant detection area 16, displays a warning to prompt the occupant to step out of the occupant detection area 16.

The door detection sensor 32 detects whether or not the doors 50 of the vehicle are open.

The correction instruction button 34 is a press button provided near the driver's seat of the vehicle 10. The correction instruction button 34 is a device for receiving input of an instruction to execute the correction mode from a crew member or the like.

The camera 20, the signage device 30, the door detection sensor 32, and the correction instruction button 34 are electrically connected to the controller 24.

Figure 7:
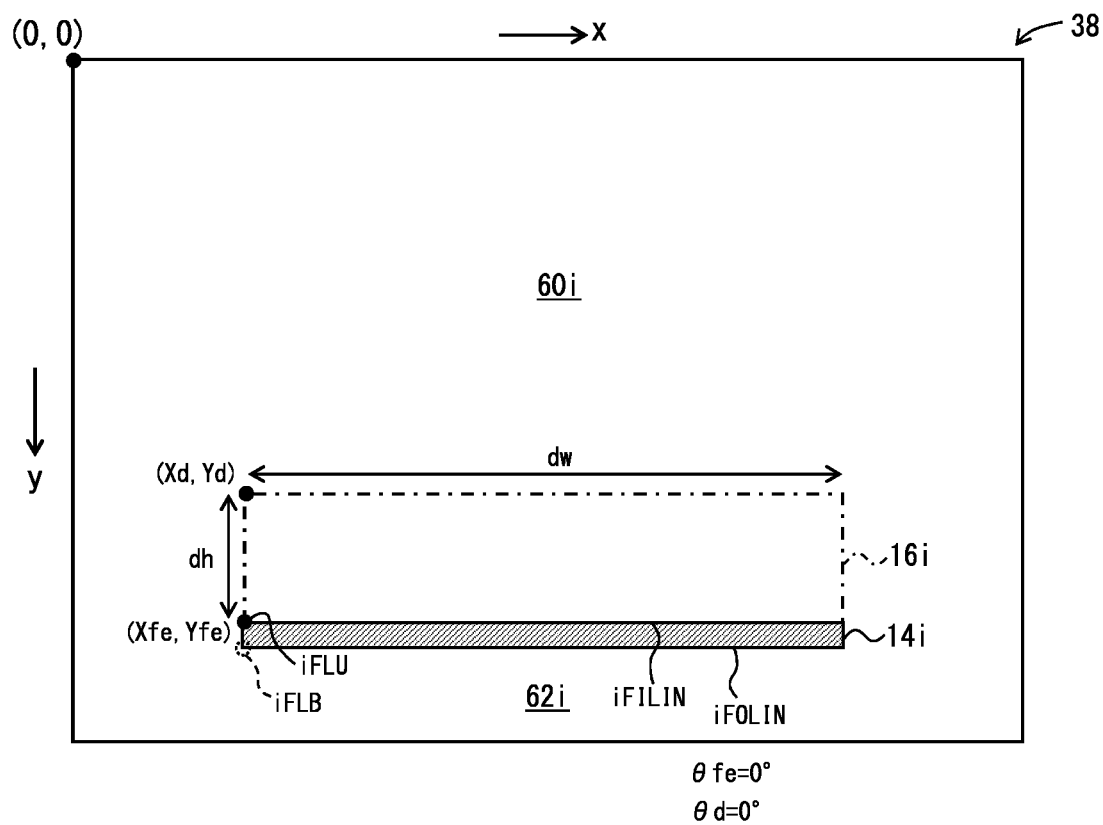
FIG. 7 is a diagram showing an example captured image.

Next, an occupant detection process performed by the occupant detection system 12 will be described. The camera 20 installed at an upper part of the vehicle interior captures, at predetermined time intervals, images of an area including the metal frame 14 and the occupant detection area 16, and outputs the captured images 38 to the controller 24. The processor 26 of the controller 24 obtains the captured images 38 from the camera 20, and stores the captured images 38 in the memory 28. FIG. 7 is a diagram showing an example captured image 38. The captured image 38 is composed of pixels arranged in the x-direction and the y-direction, and the position of each pixel is defined by x and y coordinates. The position of the pixel at the upper left corner of the captured image 38 is denoted by coordinates (0, 0).

The memory 28 has stored therein, in advance, the detection area position information 42. The detection area position information 42 includes the origin position (Xd, Yd) (the coordinates of the upper left corner), the size (dw, dh) (width dw and height dh (each indicating number of pixels)), and the slope $\theta d$ (the slope of the upper side of the area 16i with respect to the x-direction) of the occupant detection area 16i in the captured image 38.

The processor 26 extracts the occupant detection area 16i within the captured image 38 using the detection area position information 42, and analyzes this area by means of a known technique (such as pattern matching) to detect any occupant appearing in the area. When the processor 26 detects an occupant in the occupant detection area 16, the processor 26 performs a control to display a warning on the signage device 30.

Figure 8:
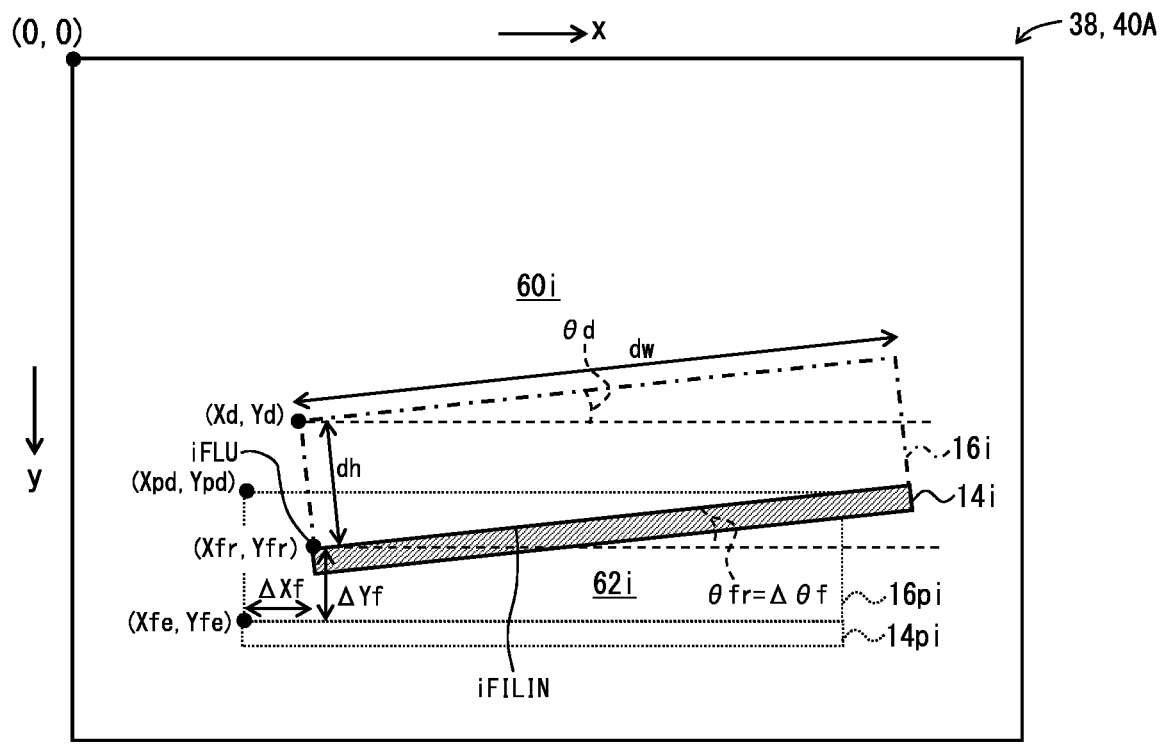
FIG. 8 is a diagram showing an example correction-purpose image.

Next, the correction mode of the occupant detection system 12 will be described. There are cases where the camera 20 (see FIG. 3) becomes shifted from its desired position when the camera 20 is being installed on the vehicle body or during travel of the vehicle. In such cases, as shown in FIG. 8, the occupant detection area 16i in the captured image 38 also becomes shifted from the occupant detection area 16pi indicated by the detection area position information 42, so that accurate occupant detection cannot be performed. In this embodiment, even when the camera 20 is shifted from the desired position, accurate occupant detection can be maintained by executing the correction mode to correct the detection area position information 42 stored in the memory 28.

The memory 28 has stored therein, in advance, the expected metal frame position 46. The expected metal frame position 46 includes the expected position (Xfe, Yfe) of characteristic point iFLU (i.e., the coordinates of the upper left corner) of the metal frame 14i (see FIG. 7) in the captured image 38, and the expected slope $\theta fe$ of the contour line iFILIN (i.e., the slope of the upper side of the metal frame 14i with respect to the x-direction).

Before shipping inspection of the vehicle 10, the detection area position information 42 and the expected metal frame position 46 are stored in the memory 28. These information items indicate the positions of the occupant detection area 16i and the metal frame 14i in the captured image 38 obtained when the camera 20 is installed at its desired position. The captured image 38 of FIG. 7 shows these positions.

Figure 6:
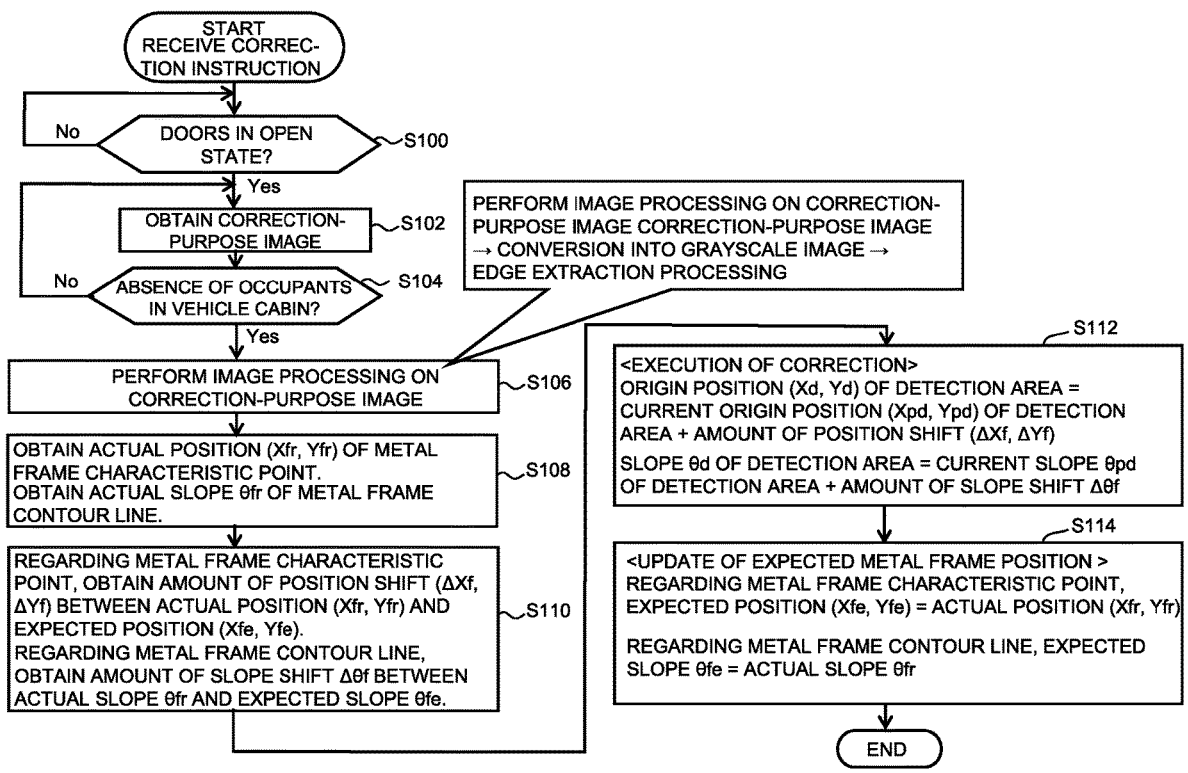
FIG. 6 is a flowchart illustrating a flow of processing performed when a correction instruction button is pressed.

FIG. 6 is a flowchart illustrating a flow of processing performed when the correction instruction button 34 is pressed. In FIGS. 6, S100 to S104 correspond to a processing of determining whether or not the correction mode can be executed, and S106 to S114 correspond to the processing of the correction mode. At the time of shipping inspection of the vehicle 10 and at predetermined time intervals during a period in which the vehicle 10 is in use, an inspector or a crew member of the vehicle 10 presses the correction instruction button 34 to cause execution of the flow of FIG. 6. Here, an example case where the correction instruction button 34 is pressed at the time of shipping inspection of the vehicle 10 will be first described.

The processor 26 of the controller 24 starts the processing from S100 upon detecting pressing of the correction instruction button 34. In S100, the processor 26 receives a detection signal from the door detection sensor 32, and checks whether the doors 50 are in an open state. Since the metal frame 14i does not appear in captured images 38 of the camera 20 when the doors 50 are in a closed state, in order to have the metal frame 14i appearing in the captured images 38, the open state of the doors 50 is confirmed at this time. When the result of S100 is NO (i.e., the doors are in a closed state), the processor 26 waits until the doors 50 are placed in an open state. On the other hand, when the result of S100 is YES (i.e., the doors are in an open state), the flow proceeds to S102.

In S102, the processor 26 obtains a captured image 38 of the camera 20 as a correction-purpose image 40, and stores this image in the memory 28. In S104, the processor 26 analyzes the correction-purpose image 40 using a known technique (such as pattern matching) to check whether or not any occupant is present in the vehicle interior. When an occupant is present, there are possibilities that the metal frame 14*i* does not appear clearly in the correction-purpose image 40 due to the occupant standing over the metal frame 14 or being present near the metal frame 14. In order to have the metal frame 14*i* appearing clearly in the correction-purpose image 40, absence of occupants in the vehicle interior is confirmed at this time. When the result of S104 is NO (i.e., an occupant is present in the vehicle interior), the processor 26 repeats S102 and S104, and waits until the occupant leaves the vehicle interior. On the other hand, when the result of S104 is YES (i.e., no occupant is present in the vehicle interior), the flow proceeds to S106.

S106 and the subsequent steps correspond to the processing of the correction mode. In S106, the processor 26 performs image processing on the correction-purpose image 40. Specifically, the processor 26 converts the correction-purpose image 40 into a grayscale image, and then performs an edge extraction processing on the grayscale image. FIG. 8 shows an example correction-purpose image 40A for a case where the camera is shifted from its desired position. In the correction-purpose image 40A, since there is a significant color difference between the metal frame 14*i* and its surroundings (i.e., the vehicle interior floor 60*i* and the outside 62*i* of the vehicle body), the contour of the metal frame 14*i* appears sharply in the image after the edge extraction processing. Further, since the metal frame 14*i* has a linear shape, the position of the metal frame 14*i* is easily identified in the image after the edge extraction processing.

Figure 9:
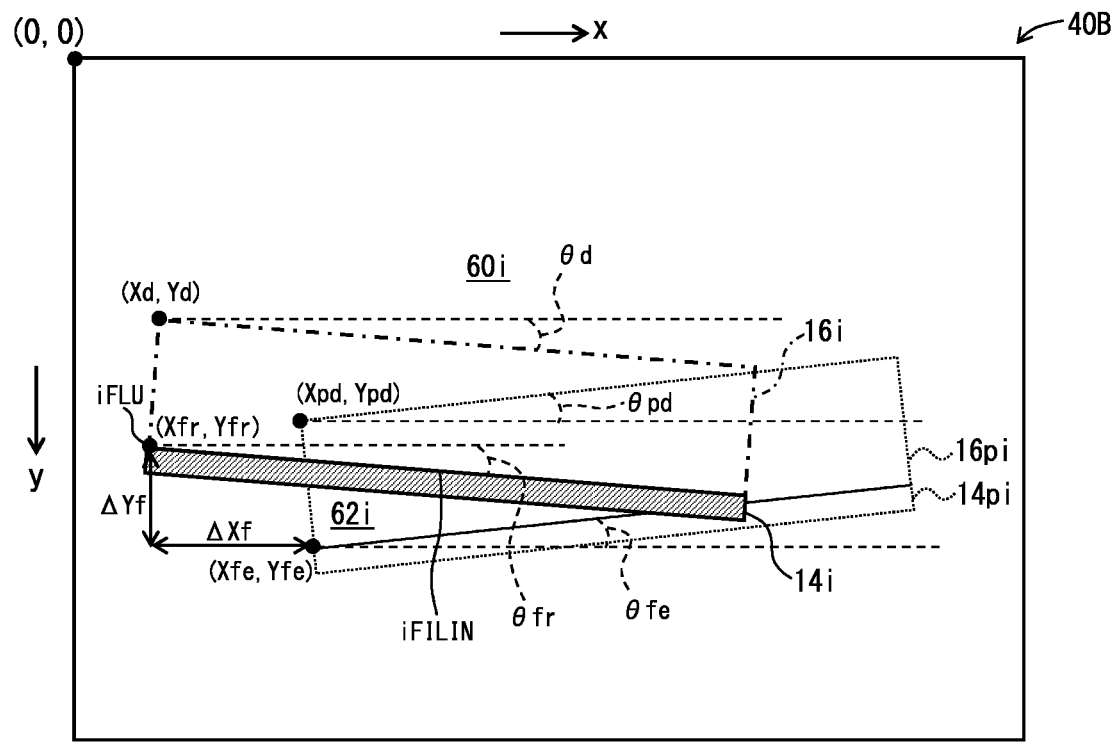
FIG. 9 is a diagram showing another example correction-purpose image.

In FIG. 8 and FIG. 9 referred to below, the metal frame 14*i* (shown as a hatched rectangle) is the metal frame appearing in the correction-purpose image 40A (or 40B), and the metal frame 14*pi* (shown as a rectangle with its contour drawn in dotted lines) is the metal frame indicated by the current expected metal frame position 46. The occupant detection area 16*i* is the occupant detection area indicated by the detection area position information 42 after performing the correction described below, and the occupant detection area 16*pi* is the occupant detection area indicated by the current detection area position information 42 (before the correction). Further, the origin position (Xd, Yd) of the occupant detection area 16*pi* is denoted as (Xpd, Ypd), and the slope θd of the occupant detection area 16*pi* is denoted as θpd.

In S108 of FIG. 6, the processor 26 obtains an actual position of the metal frame 14*i* in the correction-purpose image 40A from the image after the edge extraction processing of S106. Specifically, the processor 26 obtains the actual position (Xfr, Yfr) of the characteristic point iFLU (i.e., the coordinates of the upper left corner) of the metal frame 14*i* in the correction-purpose image 40A, and the actual slope θfr of the contour line iFILIN (i.e., the slope of the upper side with respect to the x-direction). The processor 26 stores these information items in the memory 28 as the actual metal frame position 47. In S110, the processor 26 calculates, as an amount of shift 48, a difference between the actual metal frame position 47 and the expected metal frame position 46 stored in advance in the memory 28. Specifically, the processor 26 calculates a difference between the actual position (Xfr, Yfr) and the expected position (Xfe, Yfe) of the characteristic point iFLU as the amount of position shift (ΔXf, ΔYf) (ΔXf=Xfr−Xfe, and ΔYf=Yfr−Yfe). Additionally, the processor 26 calculates a difference between the actual slope θfr and the expected slope θfe of the contour line iFILIN as the amount of slope shift Δθf (Δθf=θfr−θfe).

In S112, the processor 26 corrects (or updates) the detection area position information 42 such that the area 16*i*, which is reached by moving the current occupant detection area 16*pi* indicated by the detection area position information 42 by the amount of shift calculated in S110, becomes the new occupant detection area. Specifically, the processor 26 adds the amount of position shift (ΔXf, ΔYf) to the origin position (Xpd, Ypd) of the current occupant detection area 16*pi*, and uses the added result as the origin position (Xd, Yd) of the corrected occupant detection area 16*i* (Xd=Xpd+ΔXf, and Yd=Ypd+ΔYf). Further, the processor 26 adds the amount of slope shift Δθf to the slope θpd of the current occupant detection area 16*pi*, and uses the added result as the slope θd of the corrected occupant detection area 16*i* (θd=θpd+Δθf).

In S114, the processor 26 updates the expected metal frame position 46. Specifically, the processor 26 updates the expected position (Xfe, Yfe) of the characteristic point iFLU to the actual position (Xfr, Yfr) thereof (Xfe=Xfr, and Yfe=Yfr). Additionally, the processor 26 updates the expected slope θfe of the contour line iFILIN to the actual slope θfr thereof (θfe=θfr).

The processing of the correction mode is as described above. According to the embodiment described above, even when the camera 20 is shifted from its desired position, the position information 42 of the occupant detection area in the captured image 38 is corrected, so that accurate occupant detection can be maintained. Further, since an image of the metal frame 14 is captured using the camera 20, and the metal frame 14 is a part which is unlikely to be changed as a result of design changes in the vehicle interior or the like and which is easily detected in the correction-purpose image 40 due to its color difference from the surroundings and its linear shape, the position of the metal frame 14*i* can be accurately identified in the correction-purpose image 40. Therefore, the amount of shift 48 of the metal frame 14*i* in the correction-purpose image 40 that occurs according to a shift in the camera 20 position can be determined accurately, and since this amount of shift 48 is reflected in the position information 42 of the occupant detection area in the captured image, the position information 42 can be corrected accurately.

FIG. 9 shows a correction-purpose image 40B obtained at a point after the vehicle 10 is shipped out and when, during use of the vehicle, the correction instruction button 34 is again pressed and the correction mode is executed. FIG. 9 shows the correction-purpose image 40B for a case where, due to the use of the vehicle 10, the position of the camera 20 is further shifted from the position at the time of shipping inspection (see FIG. 8).

As a result of the previous execution of the correction mode, the memory 28 of the controller 24 has stored therein the detection area position information 42 (indicating the occupant detection area 16*pi*) and the expected metal frame position 46 (indicating the metal frame 14*pi*) corresponding to the position of the camera 20 at the time of shipping inspection. During the current execution of the correction mode, in S110 of FIG. 6, the amounts of shift (ΔXf, ΔYf, Δθf) are calculated based on the metal frame 14*pi* position (Xfe, Yfe, θfe) corresponding to the position of the camera 20 at the time of shipping inspection. Subsequently, in S112, the amounts of shift (ΔXf, ΔYf, Δθf) are added to the position (Xpd, Ypd, θpd) of the occupant detection area 16*pi* corresponding to the position of the camera 20 at the time of shipping inspection, and the detection area position information 42 is thereby corrected (i.e., Xd, Yd, and θd of the occupant detection area 16*i* are obtained). Further, in S114, the expected metal frame position 46 (Xfe, Yfe, θfe) is updated to the metal frame 14i position (Xfr, Yfr, θfr) corresponding to the current position of the camera 20 (Xfe=Xfr, Yfe=Yfr, and θfe=θfr). In this way, every time the correction mode is executed, the detection area position information 42 and the expected metal frame position 46 corresponding to the current position of the camera 20 are obtained.

In the above-described embodiment, the processor 26 calculates the amounts of shift (ΔXf, ΔYf, Δθf) by detecting, in the correction-purpose image 40, the position of the contour of the metal frame 14i on the side toward the vehicle interior floor 60i (i.e., the position of the characteristic point iFLU (at the upper left corner) and the slope of the contour line iFILIN (at the upper side)). However, according to another embodiment, the processor 26 may calculate the amounts of shift (ΔXf, ΔYf, Δθf) by detecting, in the correction-purpose image 40, the position of the contour of the metal frame 14i on the side toward the outside 62i of the vehicle body (i.e., the position of the characteristic point iFLB (at the lower left corner) and the slope of the contour line iFOLIN (at the lower side)). In that case, regarding the expected metal frame position 46, the position of the characteristic point iFLB in a captured image 38 obtained when the camera 20 is installed at the desired position is stored in advance in the memory 28 as the expected position (Xfe, Yfe), and the slope of the contour line iFOLIN in that captured image 38 is stored in advance in the memory 28 as the expected slope θfe. Further, the processor 26 detects, from a color difference between the metal frame 14i and the outside 62i of the vehicle body in a correction-purpose image 40, an actual position of the contour, on the side toward the outside 62i of the vehicle body, of the metal frame 14i in the correction-purpose image 40 (i.e., the actual position (Xfr, Yfr) of the characteristic point iFLB and the actual slope θfr of the contour line iFOLIN) (S106 and S108 of FIG. 6). The processor 26 then calculates, as the amount of shift (ΔXf, ΔYf, Δθf), a difference between the actual position of the contour of the metal frame 14i and the expected position of the contour, which is on the side toward the outside 62i of the vehicle body, of the metal frame 14pi in the correction-purpose image 40 (i.e., the expected position (Xfe, Yfe) of the characteristic point iFLB and the expected slope θfe of the contour line iFOLIN), wherein the expected position is stored in advance in the memory (S110 of FIG. 6). Subsequent processing of the correction mode is identical to that of the above-described embodiment. In this other embodiment, too, the detection area position information 42 can be corrected accurately.

In each of the above-described embodiments, when the amounts of shift (ΔXf, ΔYf, Δθf) in S110 of FIG. 6 are smaller than the respective predetermined threshold values XTh, YTh, and θTh (i.e., when ΔXf<XTh and ΔYf<YTh and Δθf<θTh), it may be configured such that the correction of the detection area position information 42 is not carried out (i.e., S112 and S114 are skipped). In that case, the correction of the detection area position information 42 is to be carried out (i.e., S112 and S114 are to be executed) when any of the conditions (i.e., ΔXf<XTh or ΔYf<YTh or Δθf<θTh) is satisfied.

The invention claimed is:

1. A vehicle occupant detection system, comprising:
a camera, which is installed at an upper part of a vehicle interior and configured to obtain a captured image by capturing a region including an occupant detection area pre-specified on a vehicle interior floor;
a memory configured to store an occupant detection area position information regarding the occupant detection area in the captured image; and
a processor configured to extract the occupant detection area within the captured image using the occupant detection area position information, and detect an occupant appearing in that area, wherein
the processor executes a correction mode for correcting the occupant detection area position information using a correction-purpose image obtained by capturing, using the camera, a linearly-extending metal frame when a vehicle door is open, wherein the metal frame is located underneath the vehicle door when the vehicle door is closed and is exposed when the vehicle door is open, and
in the correction mode, the processor
detects an actual position of the metal frame in the correction-purpose image,
calculates, as an amount of shift, a difference between the actual position of the metal frame and an expected position of the metal frame in the correction-purpose image, wherein the expected position is stored in advance in the memory, and
updates the occupant detection area position information of the captured image such that an area reached by moving, by the amount of shift, the occupant detection area of the current captured image indicated by the occupant detection area position information serves as the occupant detection area of a new captured image.

2. The vehicle occupant detection system according to claim 1, wherein the processor detects whether or not an occupant is present in the vehicle interior by analyzing the correction-purpose image, and
executes the correction mode upon detecting that no occupant is present in the vehicle interior.

3. The vehicle occupant detection system according to claim 1, wherein, in the correction mode, the processor
detects, from a color difference between the metal frame and the vehicle interior floor in the correction-purpose image, an actual position of a contour, on a side toward the vehicle interior floor, of the metal frame in the correction-purpose image, and
calculates, as the amount of shift, a difference between the actual position of the contour of the metal frame and an expected position of the contour, on the side toward the vehicle interior floor, of the metal frame in the correction-purpose image, wherein the expected position is stored in advance in the memory.

4. The vehicle occupant detection system according to claim 2, wherein, in the correction mode, the processor
detects, from a color difference between the metal frame and the vehicle interior floor in the correction-purpose image, an actual position of a contour, on a side toward the vehicle interior floor, of the metal frame in the correction-purpose image, and
calculates, as the amount of shift, a difference between the actual position of the contour of the metal frame and an expected position of the contour, on the side toward the vehicle interior floor, of the metal frame in the correction-purpose image, wherein the expected position is stored in advance in the memory.

5. The vehicle occupant detection system according to claim 1, wherein, in the correction mode, the processor
detects, from a color difference between the metal frame and an outside of a vehicle body in the correction-purpose image, an actual position of a contour, on a side toward the outside of the vehicle body, of the metal frame in the correction-purpose image, and calculates, as the amount of shift, a difference between the actual position of the contour of the metal frame and an expected position of the contour, on the side toward the outside of the vehicle body, of the metal frame in the correction-purpose image, wherein the expected position is stored in advance in the memory.

6. The vehicle occupant detection system according to claim 2, wherein, in the correction mode, the processor detects, from a color difference between the metal frame and an outside of a vehicle body in the correction-purpose image, an actual position of a contour, on a side toward the outside of the vehicle body, of the metal frame in the correction-purpose image, and calculates, as the amount of shift, a difference between the actual position of the contour of the metal frame and an expected position of the contour, on the side toward the outside of the vehicle body, of the metal frame in the correction-purpose image, wherein the expected position is stored in advance in the memory.

* * * * *